United States Patent [19]
Okudaira

[11] Patent Number: 4,460,251
[45] Date of Patent: Jul. 17, 1984

[54] ZOOM LENS FOCUSING SYSTEM
[75] Inventor: Sadao Okudaira, Saitama, Japan
[73] Assignee: Asahi Kogaku Kogyo Kabushiki Kaisha, Tokyo, Japan
[21] Appl. No.: 173,213
[22] Filed: Jul. 28, 1980
[30] Foreign Application Priority Data
Jul. 28, 1979 [JP] Japan ............................ 54-96586
[51] Int. Cl.³ .................. G02B 9/64; G02B 13/12; G02B 15/18
[52] U.S. Cl. ..................... 350/427; 350/453
[58] Field of Search ............... 350/423, 453, 427, 428
[56] References Cited
U.S. PATENT DOCUMENTS

| | | |
|---|---|---|
| 3,659,921 | 5/1972 | Hirose et al. ........................ 350/427 |
| 3,679,292 | 7/1972 | Motoaki ............................. 350/427 |
| 3,751,136 | 8/1973 | Kirchhoff ........................... 350/427 |
| 3,884,555 | 5/1975 | Suwa et al. ......................... 350/428 |
| 3,990,785 | 11/1976 | Hirose ............................. 350/427 |
| 4,015,895 | 4/1977 | Hirose ............................. 350/453 |
| 4,054,371 | 10/1977 | Yasukuni .......................... 350/428 |
| 4,298,251 | 11/1981 | Hartmann ......................... 350/428 |

Primary Examiner—John K. Corbin
Assistant Examiner—Rebecca D. Gass
Attorney, Agent, or Firm—Sughrue, Mion, Zinn, Macpeak, and Seas

[57] ABSTRACT

A zoom lens system in which aberration degradation due to focusing to a closer position, particularly a rapid increase in distortion of the focused image at the peripheral image field, is well compensated for. The lens system includes, from the object side, a first convergent lens component, a second convergent lens component, either a third convergent or divergent lens component and a fourth convergent lens component with the second and third components being movable for zooming. An afocal region is provided either in the space between the third and fourth lens components or within the fourth lens component.

4 Claims, 10 Drawing Figures

4,460,251

ZOOM LENS FOCUSING SYSTEM

BACKGROUND OF THE INVENTION

The present invention relates to a four-lens group type zoom lens focusing system.

There has been heretofore known a zoom lens composed of four lens groups, namely, in order from the object side, a first convergent lens group, a second divergent lens group, a third convergent lens group or a third divergent lens group, and a fourth convergent lens group. A moving mechanism for such a zoom lens moves the second and third lens groups while the second lens group serves mainly as a variator and the third lens group as a compensator for compensating the focusing position variation accompanying zooming.

In a zoom lens of this type, in most cases, a focusing operation accompanying a change of distance to the object is accomplished by advancing the first convergent lens group. That is, such a zoom lens is a so called front lens group focusing system. In most zoom lenses of such a type, focusing is achieved using the first lens group which is relatively simple in construction in view of the cost thereof and the lens configuration. Such zoom lenses unfortunately tend to have an aberration variation accompanying focusing. Particularly, in a zoom lens having a relatively large zoom ratio and a compact configuration, there is a rapid increase of the astigmatism in the peripheral image field with a front lens group focusing corresponding to the approach of the object point at the minimum focal length of the overall lens system. This leads to a significant defect in aberration variation.

In order to overcome such aberration degradation in such focusing, the first lens group may be separated into an object side divergent lens group and an image side convergent lens group with the divergent lens group advanced for focusing. This system is well known in the art. However, with this conventional system, since the first lens group must be divided, the number of lens components required for the first lens group is increased and the first lens group diameter is enlarged thereby increasing the cost concomitantly.

An object of the present invention is thus to provide a zoom lens focusing system in which, although a first lens group of simple construction is used as the front lens group focusing system, it is possible to compensate for aberration degradation due to focusing corresponding to the approach of the object, in particular the rapid increase of the astigmatism at the peripheral image field.

SUMMARY OF THE INVENTION

According to the present invention, a zoom lens system is composed of four lens components, namely, in order from the object side, a first convergent lens component, a second divergent lens component, a third convergent lens component or a third divergent lens component and a fourth convergent lens component with the second and third lens components being movable for zooming. The second lens component serves mainly as a variator and the third lens component serves mainly to maintain the focusing distance constant. It is a feature of the present invention that an afocal region is provided in an air gap between the third and fourth lens components or in the fourth lens component so that adjustment of the position due to object distance variation is carried out by integrally moving the lenses from the second lens component to the afocal region to thereby reduce the degradation of aberration due to the object distance variation.

DESCRIPTION OF THE PREFERRED EMBODIMENTS

A zoom lens focusing system according to the present invention will hereinafter be described.

In the prior art front lens focusing system, the front lens group is advanced for focusing of a definite distance object in order to focus an image on a focusing position of the front lens group corresponding to an infinite distance object. However, in the present invention, an afocal region is provided in an air gap between the third and fourth lens components or in the fourth lens component so that the movement of the lenses from the second lens group to the afocal region for focusing is the same as that of the front lens component of the front lens focusing system and its direction of movement is toward the image. Accordingly, in the present invention aberration variation is also caused by the distance variation between the first and second lens components during focusing as in the front lens group focusing system, but the distance variation is offset by the distance variation in the afocal region. On the other hand, for the front lens group focusing system, the variation of aberration affects the image surface without compensation.

Figure 1:
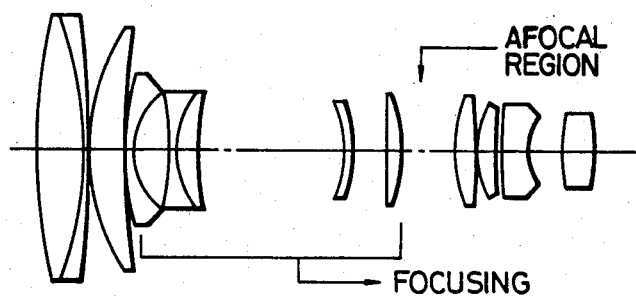
FIG. 1 is a cross-sectional view of a zoom lens construction embodying the focusing systems of the invention and the prior art.
Figure 2:
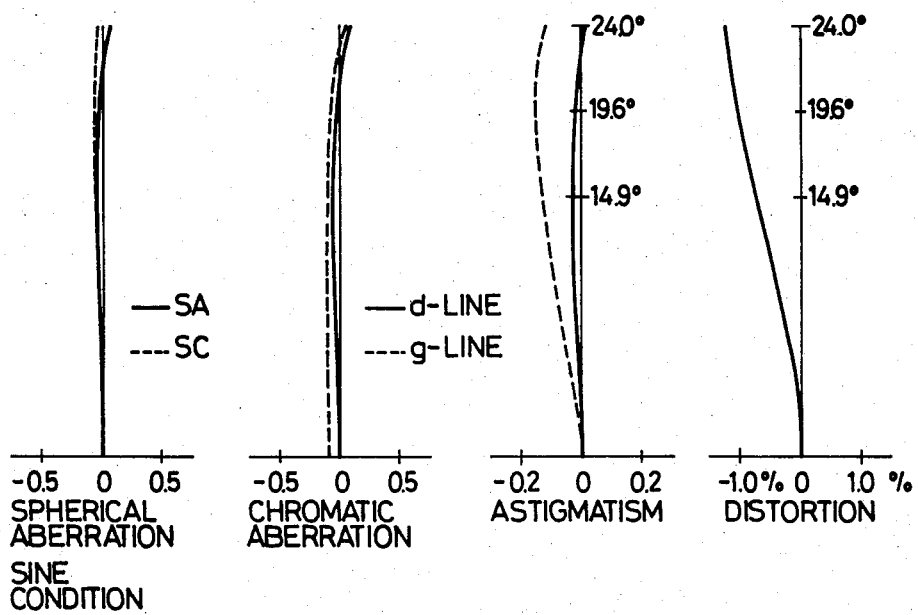
FIGS. 2, 3 and 4 are various aberration graphs at minimum, medium and maximum focal lengths, respectively, for an infinite object for the lens construction shown in FIG. 1 according to the focusing system of the invention.
Figure 3:
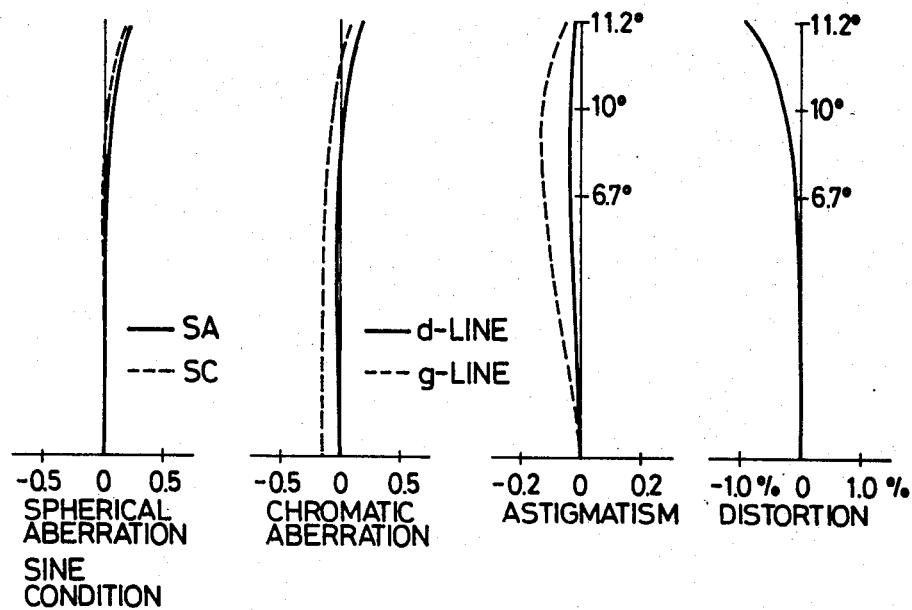
Figure 4:
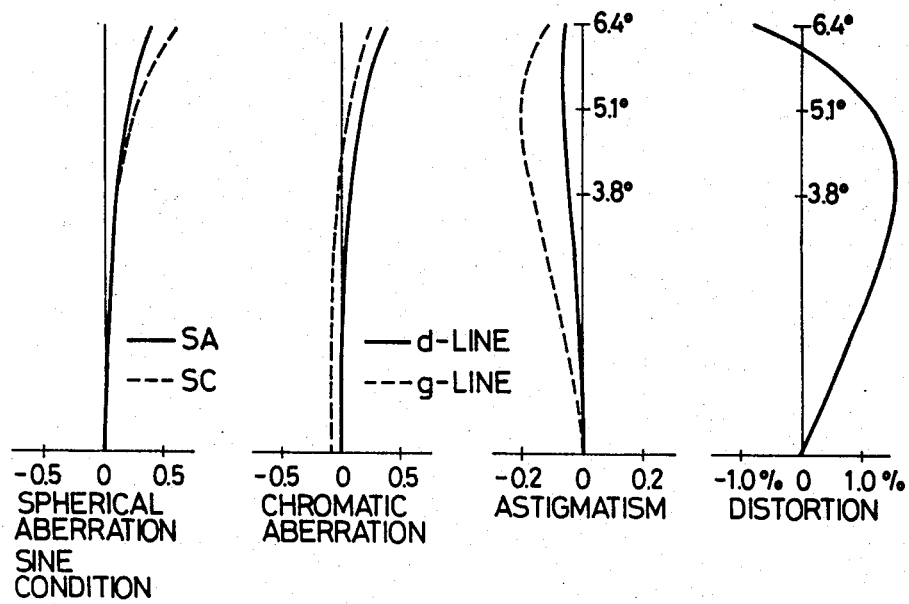
Figure 5:
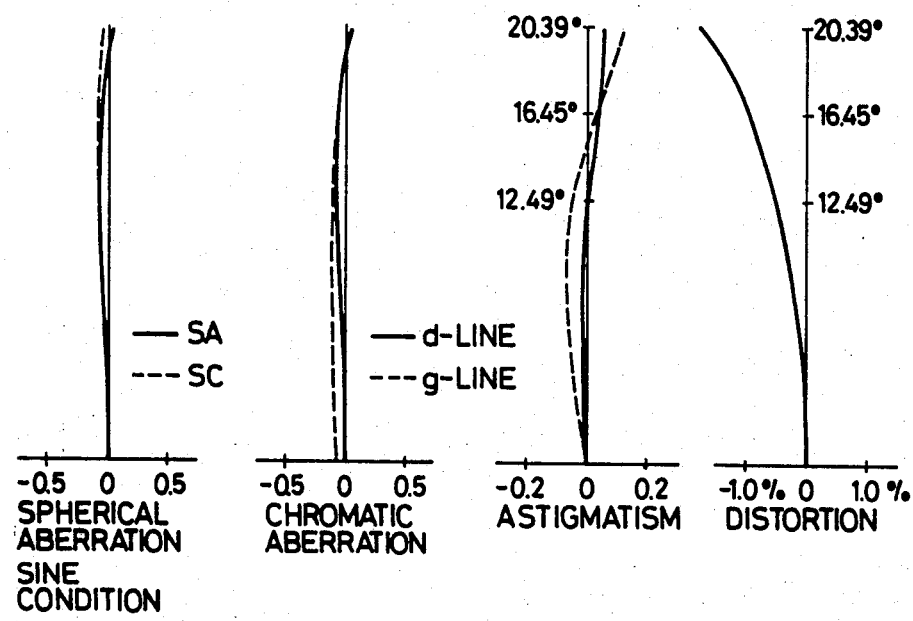
FIGS. 5, 6 and 7 are various aberration graphs at minimum, medium and maximum focal lengths, respectively, for a definite object with an image magnification of 1/40 obtained with a conventional front lens group focusing system.
Figure 6:
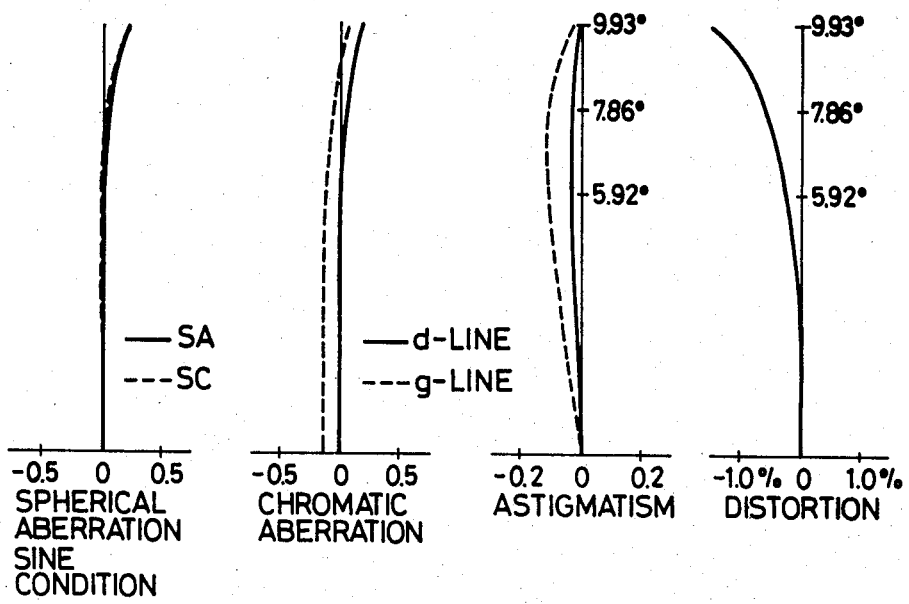
Figure 7:
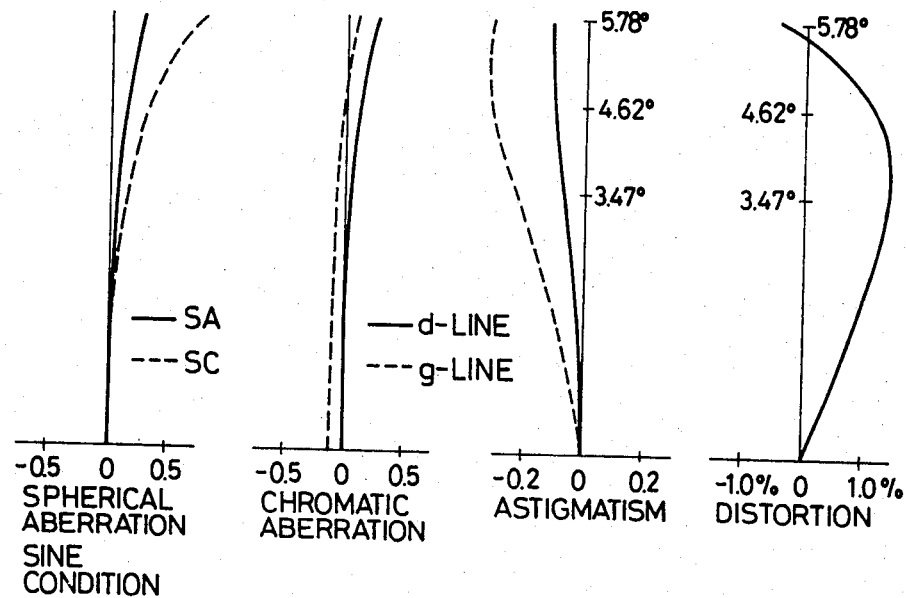
Figure 8:
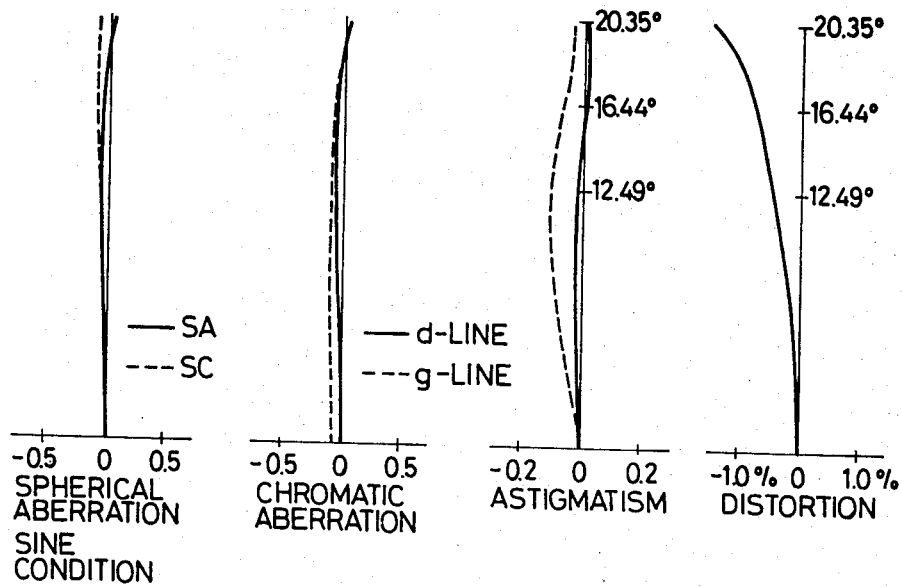
FIGS. 8, 9 and 10 are various aberration graphs at minimum, medium and maximum focal lengths, respectively, for a definite object with an image magnification of 1/40 obtained with the lens construction shown in FIG. 1 constructed according to the focusing system of the present invention.
Figure 9:
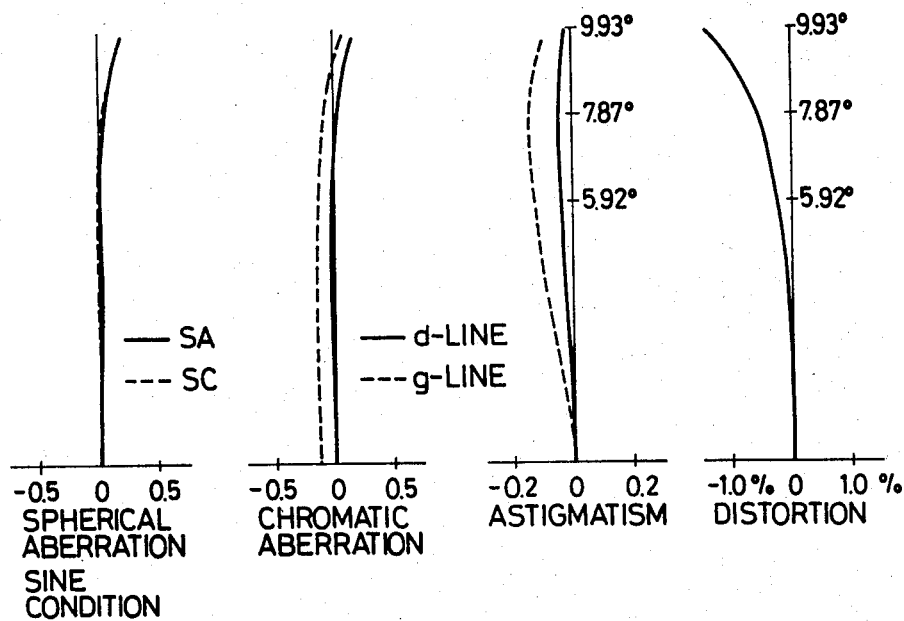
Figure 10:
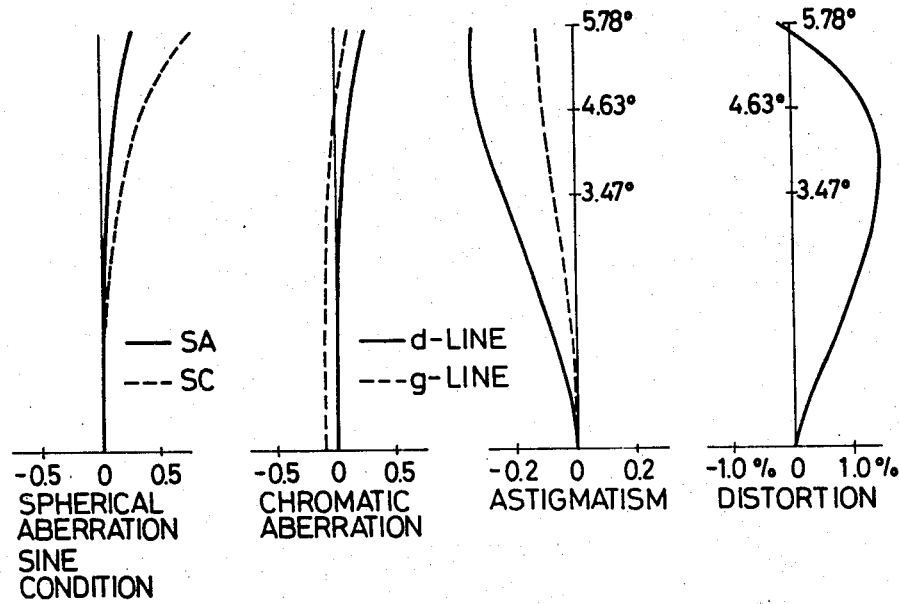

A difference between the zoom lens focusing system according to the present invention and the front lens group focusing system according to the prior art will now be described in greater detail with reference to the accompanying drawings in which FIG. 1 is a cross-sectional view of a zoom lens construction embodying the focusing systems of the invention and the prior art, FIGS. 2, 3 and 4 are aberration graphs at minimum, medium and maximum focal lengths, respectively, for an infinite object of the lens construction shown in FIG. 1 according to the focusing system of the invention, FIGS. 5, 6 and 7 are aberration graphs at minimum, medium and maximum focal lengths, respectively, for a definite object having an image magnification of 1/40 obtained with a lens construction according to the conventional front lens group focusing system, and FIGS 8, 9 and 10 are aberration graphs at minimum, medium and maximum focal lengths, respectively, for a definite object having an image magnification of 1/40 obtained with the lens construction shown in FIG. 1 according to the focusing system according to the present invention. As is obvious from a comparison between FIGS. 5 and 8 showing the various aberration graphs at the minimum focal lengths, the degradation of aberration in the peripheral portion of the image field is improved with the zoom lens system according to the present invention.

Specific data for a lens construction embodying the present invention is listed below in the Table in which f is the focal distance, the R values are the radii of curvature of the respective lens surfaces, the D values are the lens component thicknesses or the spacings between adjacent lens components, the N values are the refractive indices of the lens components at the d-line, and $v$ is the Abbe number. As is apparent from the data chart, according to the present invention, aberration variation generated with a distance variation between the first and second lens components by the distance variation of the afocal region is eliminated while simultaneously the axial aberrations are not degraded since aberration due to light fluxes near to the optical axis is little varied to thereby prevent degradation of the image at its image field periphery.

TABLE 1

| | f = 12.5~49.0 FNO 1:1.85 | | | |
|---|---|---|---|---|
| | R | D | N | $v$ |
| 1 | 104.999 | 7.29 | 1.54771 | 62.9 |
| 2 | −55.249 | 0.84 | 1.80518 | 25.4 |
| 3 | −183.803 | 0.07 | | |
| 4 | 33.220 | 6.03 | 1.65160 | 58.6 |
| 5 | 123.546 | variable (0.10~21.66) | | |
| 6 | 41.695 | 1.17 | 1.88300 | 42.1 |
| 7 | 11.412 | 6.93 | | |
| 8 | −31.362 | 0.76 | 1.48749 | 70.1 |
| 9 | 15.191 | 3.48 | 1.80518 | 25.4 |
| 10 | 56.996 | variable (23.87~2.45) | | |
| 11 | −17.074 | 1.25 | 1.61800 | 63.4 |

TABLE 1-continued

| | f = 12.5~49.0 FNO 1:1.85 | | | |
|---|---|---|---|---|
| | R | D | N | $v$ |
| 12 | −24.203 | variable (5.68~5.54) | | |
| 13 | 526.735 | 2.12 | 1.77250 | 49.6 |
| 14 | −35.906 | 9.21 | | |
| 15 | 20.524 | 3.36 | 1.56873 | 63.1 |
| 16 | −268.840 | 0.10 | | |
| 17 | 13.705 | 3.50 | 1.51821 | 65.0 |
| 18 | 63.658 | 0.89 | | |
| 19 | −6730.378 | 4.45 | 1.80518 | 25.4 |
| 20 | 10.283 | 5.49 | | |
| 21 | 21.604 | 5.67 | 1.67000 | 57.4 |
| 22 | −90.913 | 1.00 | | |

What is claimed is:

1. A zoom lens system comprising: four lens components including, in order from the object side, a first convergent lens component, a second divergent lens component, a third lens component and a fourth convergent lens component, said second and third lens components being movable for zooming, said second lens component serving mainly as a variator and said third lens component serving mainly to maintain the focusing distance constant, said four lens components including an afocal region downstream of said third lens component, where the downstream direction is defined as the direction away from said object side, all of the lenses from said second lens component to said afocal region comprising a focusing lens component, and wherein focusing adjustment to compensate for object distance variation is carried out by integrally moving said focusing lens component with respect to said first convergent lens component to thereby reduce the degradation of aberration due to object distance variation.

2. A zoom lens system as claimed in claim 1, wherein said third lens component is a divergent lens component.

3. A zoom lens system as claimed in claim 1, wherein said afocal region is within said fourth lens component.

4. A zoom lens system as claimed in claim 2, wherein said afocal region is within said fourth lens component.

* * * * *